United States Patent
Shi et al.

(10) Patent No.: US 9,607,371 B2
(45) Date of Patent: Mar. 28, 2017

(54) MESOSCOPIC DEFECT DETECTION FOR RETICLE INSPECTION

(71) Applicants: Rui-fang Shi, Cupertino, CA (US); Zhian Guo, Fremont, CA (US); Bing Li, Milpitas, CA (US)

(72) Inventors: Rui-fang Shi, Cupertino, CA (US); Zhian Guo, Fremont, CA (US); Bing Li, Milpitas, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 60 days.

(21) Appl. No.: 14/227,782

(22) Filed: Mar. 27, 2014

(65) Prior Publication Data

US 2015/0279014 A1 Oct. 1, 2015

Related U.S. Application Data

(60) Provisional application No. 61/807,109, filed on Apr. 1, 2013.

(51) Int. Cl.
*G06K 9/00* (2006.01)
*G06T 7/00* (2017.01)
*G06K 9/46* (2006.01)

(52) U.S. Cl.
CPC ............ *G06T 7/001* (2013.01); *G06K 9/4642* (2013.01); *G06K 2209/19* (2013.01)

(58) Field of Classification Search
None
See application file for complete search history.

(56) References Cited

U.S. PATENT DOCUMENTS 6,897,444 B1 * 5/2005 Adler .................. G01N 23/225
250/306
6,999,611 B1 2/2006 Lopez et al.
(Continued)

FOREIGN PATENT DOCUMENTS

| EP | 1093017 B1 | 9/2007 |
|---|---|---|
| WO | 2010065676 | 6/2010 |
| WO | 2013106101 A1 | 7/2013 |

OTHER PUBLICATIONS

International Search Report and Written Opinion from PCT/US2014/032582, issued Aug. 22, 2014, KLA-Tencor Corporation, pp. 1-10.
(Continued)

*Primary Examiner* — Jayesh A Patel
(74) *Attorney, Agent, or Firm* — Meyertons, Hood, Kivlin, Kowert & Goetzel, P.C.; Eric B. Meyertons

(57) ABSTRACT

In some embodiments, a method and/or system may include detecting defects in photomasks. The method may include acquiring a first image of a first die. The method may include acquiring a second image of a second die. In some embodiments, the method may include dividing the first and the second image into a number of first and second portions respectively. The method may include reducing one or more differences in sizing of the first and the second portions. In some embodiments, the method may include determining a difference in a function derived from an image intensity between the corresponding first and second portions. The method may include summing the differences in the function between the corresponding first and second portions. The method may include detecting mesoscopic scale defects in the second die.

20 Claims, 1 Drawing Sheet

(56) References Cited

U.S. PATENT DOCUMENTS

| | | | |
|---|---|---|---|
| 7,486,814 | B2 | 2/2009 | Eran et al. |
| 7,551,767 | B2 | 6/2009 | Tsuchiya et al. |
| 8,446,565 | B2 * | 5/2013 | Hsuan .................... G03B 27/54 355/67 |
| 8,559,001 | B2 | 10/2013 | Chang et al. |
| 8,571,301 | B2 * | 10/2013 | Sonoura ............... G01N 21/956 382/145 |
| 2003/0048939 | A1 | 3/2003 | Lehman |
| 2004/0130711 | A1 | 7/2004 | Werf et al. |
| 2006/0239535 | A1 | 10/2006 | Takada et al. |
| 2007/0035728 | A1 * | 2/2007 | Kekare .................... G03F 1/84 356/237.5 |
| 2008/0166054 | A1 | 7/2008 | Tsuchiya et al. |
| 2008/0259323 | A1 | 10/2008 | Hirano et al. |
| 2008/0281438 | A1 * | 11/2008 | Middlebrooks ...... G05B 13/041 700/29 |
| 2011/0044528 | A1 | 2/2011 | Tsuchiya et al. |
| 2012/0114222 | A1 | 5/2012 | Shimura |
| 2013/0236084 | A1 | 9/2013 | Li et al. |
| 2013/0322737 | A1 | 12/2013 | Murakami et al. |

OTHER PUBLICATIONS

Goonesekera et al., "Results of new CD detection capability on advanced reticles", KLA-Tencor Corporation, May 19, 2008, 10 pages. [http://www.amtc-dresden.com/content/dls/7028_88.pdf].

Van Der Velden et al., "Radiation Generated Plasmas a challenge in modern lithography", 2008, 187 pages. [http://alexandria.tue.nl/extra2/200810574.pdf].

Oneil et al., "Photoionization of Molecular Hydrogen", published online Aug. 12, 2008, J. Chem. Phys. 69, 2126 (1978). [http://scitation.aip.org/content/aip/journal/jcp/69/5/10.1063/1.436813].

Gioumousis et al., "Reactions of Gaseous Molecule Ions with Gaseous Molecules", published online Aug. 13, 2004, J. Chem. Phys. 29, 294 (1958). [http://scitation.aip.org/content/aip/journal/jcp/29/2/10.1063/1.1744477].

* cited by examiner

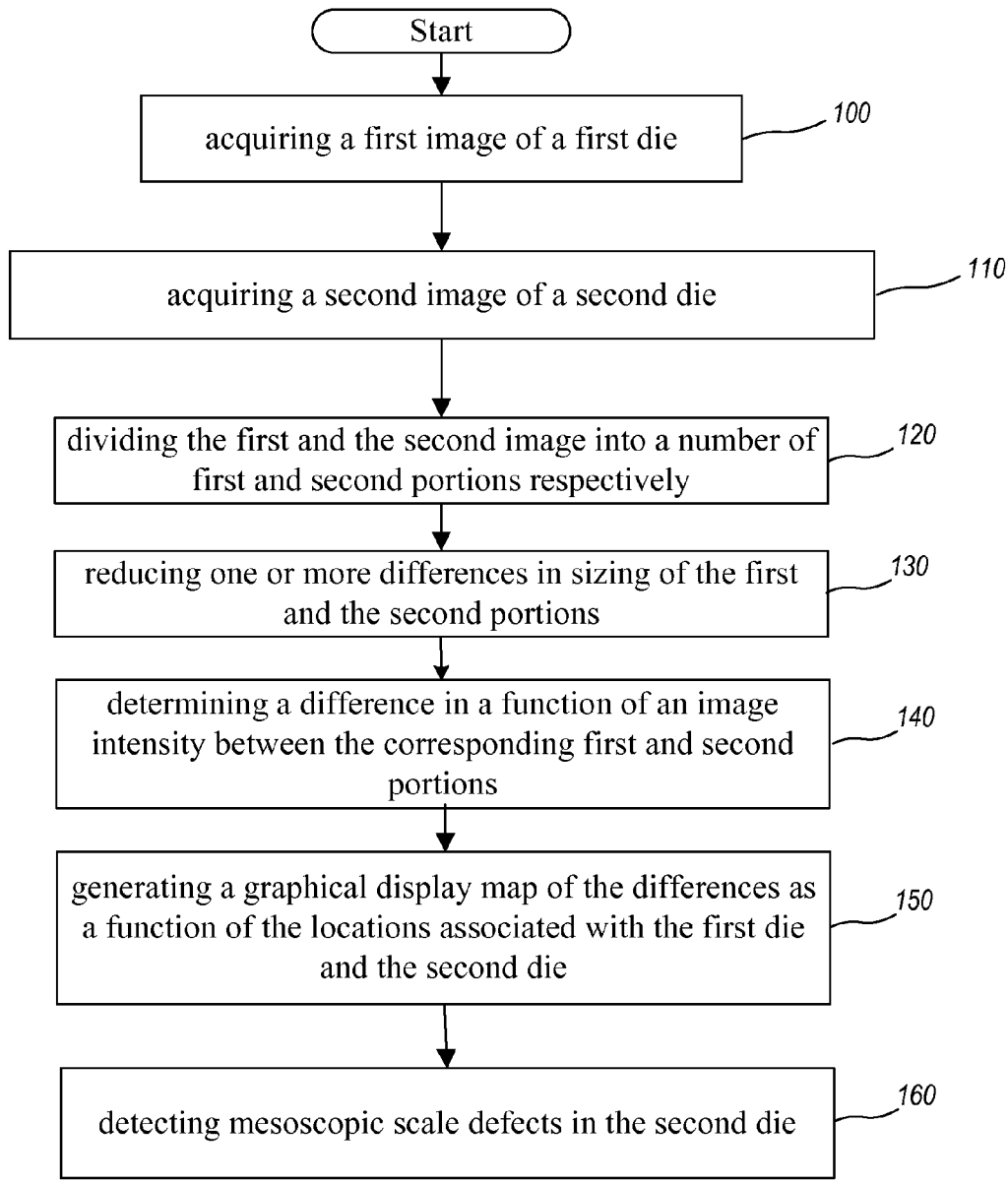

MESOSCOPIC DEFECT DETECTION FOR RETICLE INSPECTION

PRIORITY CLAIM

This application claims the benefit of U.S. provisional application No. 61/807,109 entitled "MESOSCOPIC DEFECT DETECTION FOR RETICLE INSPECTION" and filed on Apr. 1, 2013, all of which is incorporated by reference herein in its entirety.

BACKGROUND OF THE INVENTION

1. Field of the Invention

The present disclosure generally relates to systems and methods related to detecting defects in reticles or photomasks. More particularly, the disclosure generally relates to systems and methods for detecting defects in reticles and/or the photomasks used to produce dies by comparing images (e.g., of said dies).

2. Description of the Relevant Art

Current demands for semiconductor devices with high density and performance associated with increased transistor and circuit speeds and improved reliability. Such demands require formation of semiconductor devices with greater precision and uniformity, requiring meticulous process monitoring.

One process used in the production of semiconductor devices is photolithography. In photolithography masks or "reticles", are used to transfer circuitry patterns to semiconductor wafers. A photolithographic reticle includes an intricate set of geometric patterns corresponding to the circuit components to be integrated onto the wafer. Every reticle in a series is used to transfer its corresponding pattern onto a photosensitive layer. The transfer of the reticle pattern onto the photoresist layer is typically performed by an optical exposure tool, which directs light or other radiation through the reticle to expose the photoresist. The photoresist is used to form a photoresist mask, and the underlying polysilicon or metal layer is selectively etched in accordance with the mask to form features such as lines or gates.

It should be appreciated that any defect on the reticle, such as an extra or a missing chrome may transfer onto the fabricated wafer in a repeated manner. Thus, it is of importance to inspect the reticles and detect any defects thereupon.

Defects on a reticle or photomask are detrimental to wafer yield in the semiconductor manufacturing process. Traditionally, there have been two inspection modes, die-to-die (D:D) and die-to-database (D:DB). Both modes rely on one basic assumption: the number of defective pixels in a processing patch (defined as a small rectangular region on the photomask) is a small fraction of the total number of pixels present in the processing patch. Most of the algorithms take advantage of this assumption to reduce dynamic tool noises and photomask plate noises. For example, there have been methods to dynamically compensate for slight feature sizing differences between a test die and reference die. As a result, most of the defect detection methods are tailored to find defects on the order of $10^1$ to $10^2$ nm length scale.

However, these existing methods do not have the capability or sensitivity to detect defects that have length scales comparable to a processing patch. These so-called mesoscopic defects can be resulting from photomask writing errors. If un-detected, they can cause yield-limiting or yield-killing consequences.

SUMMARY

In some embodiments, a method and/or system may include detecting defects in photomasks. The method may include acquiring a first image of a first die. The method may include acquiring a second image of a second die. In some embodiments, the method may include dividing the first and the second image into a number of first and second portions respectively. The method may include reducing (e.g., minimizing) one or more differences in sizing of the first and the second portions. In some embodiments, the method may include determining a difference in a function derived from an image intensity between the corresponding first and second portions. The method may include summing the differences in the function between the corresponding first and second portions. The method may include generating a graphical display map of the differences as a function of the locations on the surfaces associated with the first die and the second die. The method may include detecting mesoscopic scale defects in the second die.

In some embodiments, the first image and/or second image is acquired using transmitted light or reflected light.

In some embodiments, the first die comprises a reference die. In some embodiments, the second die comprises a test die.

In some embodiments, the method may include dividing the first and the second image into a number of first and second portions respectively. The method may include reducing one or more differences in sizing of the first and the second portions. In some embodiments, reducing any difference in sizing of the first and second image includes using b|∇I(x,y)|. b may be linearly proportional to the critical dimension (CD) sizing difference. b may be derived from minimizing the following objective function:

$$\sum_{x,y} [I_{test}(x, y) - I_{ref}(x, y) - b|\nabla I_{ref}(x, , y)|]^2.$$

In some embodiments, b varies within a first and/or a second portion the portion is subdivided into subportions. In some embodiments, the method includes mapping defects in the second die upon deriving b.

In some embodiments, the first die includes a theoretically modelled die. In some embodiments, the method includes calibrating the theoretically modelled die. Calibrating the theoretically modelled die may include deriving a set of modeling parameters (b; $\vec{a}$) wherein b denotes the bias amount on features and $\vec{a}$ denotes a set of modeling parameters. Calibrating the theoretically modelled die may include freezing $\vec{a}$ and floating b, for each patch image, by minimizing $$\sum_{x,y} [I_{test}(x, y) - I_{ref}(x, y; b) |]^2.$$

In some embodiments, a system may include a processor and a memory medium. The memory medium may be coupled to the processor that stores program instructions. The program instruction may be executable by the processor to acquire a first image of a first die. The program instruction may be executable by the processor to acquire a second image of a second die. The program instruction may be executable by the processor to divide the first and the second image into approximately equivalent first and second portions. The program instruction may be executable by the processor to reduce any difference in sizing of the first and the second portions. The program instruction may be executable by the processor to detect defects in the second die using the first die as a reference.

BRIEF DESCRIPTION OF THE DRAWINGS

Advantages of the present invention may become apparent to those skilled in the art with the benefit of the following detailed description of the preferred embodiments and upon reference to the accompanying drawings.

FIG. 1 depicts an embodiment of a representation of a method of detecting defects in photomasks.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process affects another process or structure without the involvement of an intermediate step or component.

The term "mesoscopic" as used herein generally refers to length scales on the order of $10^3$ nm to $10^2$ μm. For example herein there may be made reference to mesoscopic defects meaning defects on the order of $10^3$ nm to $10^2$ μm in the lateral dimension.

In some embodiments, a method and/or system may include detecting defects in photomasks. FIG. 1 depicts an embodiment of a representation of a method of detecting defects in photomasks. The method may include acquiring a first image of a first die 100. The method may include acquiring a second image of a second die 110. In some embodiments, the method may include dividing the first and the second image into a number of first and second portions respectively 120. The method may include reducing any difference in sizing of the first and the second portions 130. In some embodiments, the method may include determining any differences in a function derived from an image intensity between the corresponding first and second portions 140. The method may include summing the differences in the function between the corresponding first and second portions. The method may include generating a graphical display map of substantially all the differences as a function of the locations associated with the first die and the second die 150. The method may include detecting mesoscopic scale defects in the second die 160. In some embodiments, the method may include detecting mesoscopic scale defects in the second die using the first die as a reference. In some embodiments, the method and/or system may be applicable to D:D inspection mode.

In some embodiments, the first image and/or second image is acquired using transmitted light or reflected light. In some embodiments, the first image and/or second image is acquired using a combination of transmitted light and reflected light. For example, transmitted light and reflected light may be combined at a detector.

In some embodiments, the first die comprises a reference die. In some embodiments, the second die comprises a test die.

In the D:D inspection mode, denote $I_{test}(x,y)$ and $I_{ref}(x,y)$ as optical images from reference and test dies, respectively, for a particular processing patch. These optical images can be acquired from transmitted light or reflected light. In some embodiments, one may assume image registration has already been performed. In some embodiments, wherein reducing any difference in sizing of the first and second image includes using $b|\nabla I(x,y)|$. b may be linearly proportional to the CD sizing difference. b may be derived from minimizing the following objective function:

$$\sum_{x,y} [I_{test}(x, y) - I_{ref}(x, y) - b|\nabla I_{ref}(x, , y)|]^2.$$

If b is slow varying and does not change within a process patch, the above summation may be used over all the valid pixels within the patch. If b changes within a patch, one may divide a patch into several subpatches. For parts of the following discussion, it will be assumed b is a constant within a patch. In some embodiments, when b varies significantly within a first and/or a second portion of the first and second image the portion is subdivided into subportions. In some embodiments, the method includes mapping mesoscopic defects in the second die upon deriving b.

Once b is determined for each patch, a plate-level map may be generated. Defect detection threshold is normally set at a level to capture outliers (e.g., defects) with low count of nuisances or false counts (background noises).

Consider the case where there are n dies (n≥3) and given n−1 measurements ($b_i$):

$$b_1 \equiv d_2 - d_1,$$
$$b_2 \equiv d_3 - d_2,$$
$$\ldots$$
$$b_{n-1} \equiv d_n - d_{n-1}.$$

In the above equations, $b_i$ is the differential bias and $d_i$ is the CD bias amount (not directly measurable) for the $i^{th}$ die. What one desires is the differential bias between $d_i$ and the average CD bias <d> where <d> defined as $$\langle d \rangle \equiv \sum_i d_i / n$$

in the form of $d_i' \equiv d_i - \langle d \rangle$. One may show that $$d_1' = -\frac{(n-1)b_1 + (n-2)b_2 + \ldots + b_{n-1}}{n},$$
$$d_2' = d_1' + b_1,$$
$$\ldots$$
$$d_n' = d_{n-1}' + b_{n-1}.$$

Using the above set of questions, one may convert neighboring die differential bias information into differential bias where each die would show the CD deviation from the average from all dies.

In some embodiments, the method and/or system may be applicable to D:DB inspection mode. In some embodiments, the first die includes a theoretically modelled die. One may utilize the same equation $$\sum_{x,y} [I_{test}(x, y) - I_{ref}(x, y) - b|\nabla I_{ref}(x, , y)|]^2$$

to minimize the difference between the test and reference images. What is different here is the test image is optical and the reference image is theoretically modeled. In some embodiments, the method includes calibrating the theoretically modelled die. Calibrating the theoretically modeled die may include deriving a set of modeling parameters (b; $\vec{a}$) wherein b denotes the bias amount on features and $\vec{a}$ denotes a set of modeling parameters. Calibrating the theoretically modeled die may include freezing $\vec{a}$ and floating b, for each patch image, by minimizing $$\sum_{x,y} [I_{test}(x, y) - I_{ref}(x, y; b)]^2.$$

The resultant parameter value b is an approximation for the mesoscopic bias amount for that patch.

It is noted that the herein described embodiments apply to various imaging modes. For example, the images can be acquired by a high resolution microscope with both transmitted and reflected light. These images may be acquired by an imaging condition similar or identical to that of a stepper or scanner. In some embodiments a parameter is deduced that is proportional to the CD various on the mask based on optical images (D:D) and a combination of optical and modeled images (D:DB).

In some embodiments, a system may include a processor and a memory medium. The memory medium may be coupled to the processor that stores program instructions. The program instruction may be executable by the processor to acquire a first image of a first die. The program instruction may be executable by the processor to acquire a second image of a second die. The program instruction may be executable by the processor to divide the first and the second image into approximately equivalent first and second portions. The program instruction may be executable by the processor to reducing any difference in sizing of the first and the second portions. The program instruction may be executable by the processor to detect defects in the second die using the first die as a reference.

There are numerous advantages of the herein described embodiments over current methods. Compared to standard defect detection methods which are only sensitive to microscopic defects, the current invention can detect mesoscopic and macroscopic defects. Compared to intensity CDU-based methods, the current invention is less sensitive to pattern density effects and is a more direct measurement of the feature sizing difference for a multi-die photomask. To our best knowledge, there is no known existing method to detect mesoscopic feature sizing defects in a D:DB inspection mode.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of detecting defects in photomasks, comprising:
    acquiring a first image of a first die;
    acquiring a second image of a second die;
    dividing the first and the second image into a number of first and second portions respectively;
    reducing one or more differences in sizing of the first and the second portions comprising determining $b|\nabla I(x,y)|$, wherein b is linearly proportional to a critical dimension sizing difference;
    determining differences in a function derived from an image intensity between the corresponding first and second portions;
    summing the differences in the function between the corresponding first and second portions; and
    detecting mesoscopic scale defects in the second die.

2. The method of claim 1, wherein the first image and/or the second image is acquired using transmitted light and/or reflected light.

3. The method of claim 1, further comprising generating a graphical display map of the differences as a function of the locations associated with the first die and the second die.

4. The method of claim 1, wherein the first die comprises a reference die.

5. The method of claim 1, wherein the second die comprises a test die.

6. The method of claim 1, wherein b is derived from minimizing the following objective function:

$$\sum_{x,y} [I_{test}(x, y) - I_{ref}(x, y) - b|\nabla I_{ref}(x, , y)|]^2.$$

7. The method of claim 1, wherein when b varies within a first and/or a second portion of the first and second images the first and/or the second portion is subdivided into subportions.

8. The method of claim 6, further comprising mapping defects in the second die upon deriving b.

9. The method of claim 1, wherein the first die comprises a theoretically modelled die.

10. The method of claim 9, further comprising calibrating the theoretically modelled die, comprising:
    deriving a set of modeling parameters (b; $\vec{\alpha}$) wherein b denotes the bias amount on features and $\vec{\alpha}$ denotes a set of modeling parameters; and
    freezing $\vec{\alpha}$ and floating b, for each patch image, by minimizing $$\sum_{x,y} [I_{test}(x, y) - I_{ref}(x, y; b)|]^2.$$

11. A system, comprising:
    a processor;
    a memory medium coupled to the processor that stores program instructions executable by the processor to:
        acquire a first image of a first die;
        acquire a second image of a second die;
        divide the first and the second image into a number of first and second portions respectively;
        reduce one or more differences in sizing of the first and the second portions comprising determining $b|\nabla I(x,y)|$, wherein b is linearly proportional to a critical dimension sizing difference;
        determine differences in a function derived from an image intensity between the corresponding first and second portions;
        sum the differences in the function between the corresponding first and second portions; and
        detect mesoscopic scale defects in the second die.

12. The system of claim 11, wherein the program instructions are further executable by the processor to generate a graphical display map of the differences as a function of the locations associated with the first die and the second die.

13. The system of claim 11, wherein the first die comprises a reference die.

14. The system of claim 11, wherein the second die comprises a test die.

15. The system of claim 11, wherein b is derived from minimizing the following objective function:

$$\sum_{x,y} [I_{test}(x, y) - I_{ref}(x, y) - b|\nabla I_{ref}(x, , y)|]^2.$$

16. The system of claim 11, wherein when b varies within a first and/or a second portion the portion is subdivided into subportions.

17. The system of claim 16, further comprising mapping defects in the second die upon deriving b.

18. The system of claim 11, wherein the first die comprises a theoretically modelled die.

19. The system of claim 18, further comprising calibrating the theoretically modelled die, comprising:

deriving a set of modeling parameters (b; $\vec{\alpha}$) wherein b denotes the bias amount on features and $\vec{\alpha}$ denotes a set of modeling parameters; and freezing $\vec{\alpha}$ and floating b, for each patch image, by minimizing $$\sum_{x,y} [I_{test}(x, y) - I_{ref}(x, y; b)\,]^2.$$

20. A method of detecting defects in photomasks, comprising:

acquiring a first image of a first die, wherein the first die comprises a theoretically modelled die;

calibrating the theoretically modelled die, comprising:

deriving a set of modeling parameters (b; $\vec{\alpha}$) wherein b denotes the bias amount on features and $\vec{\alpha}$ denotes a set of modeling parameters; and freezing $\vec{\alpha}$ and floating b, for each patch image, by minimizing $$\sum_{x,y} [I_{test}(x, y) - I_{ref}(x, y; b)\,]^2;$$

acquiring a second image of a second die;

dividing the first and the second image into a number of first and second portions respectively;

reducing one or more differences in sizing of the first and the second portions;

determining differences in a function derived from an image intensity between the corresponding first and second portions;

summing the differences in the function between the corresponding first and second portions; and detecting mesoscopic scale defects in the second die.

* * * * *